UNITED STATES PATENT OFFICE.

PIERRE FERRA, OF CALUIRE-ET-CUIRE, NEAR LYON, FRANCE.

COMPOSITION FOR HEAT-INSULATING AND THERMO-ELECTRIC PURPOSES.

1,075,773.

Specification of Letters Patent.   Patented Oct. 14, 1913.

No Drawing.   Application filed November 25, 1911. Serial No. 662,487.

*To all whom it may concern:*

Be it known that I, PIERRE FERRA, a citizen of the Republic of France, residing at Caluire-et-Cuire, near Lyon, France, have invented a new and useful Improvement in Compositions for Heat-Insulating and Thermo-Electric Purposes, of which the following is a specification.

This invention relates to a new compound having a high thermal resistance and a low electric resistance. By reason of such physical qualities the compound is of utility for the manufacture of thermo-electric elements, and in its use for this purpose electric current is produced with efficiency by the application of heat. The compound is also of advantage for use as an insulating material of heat or cold.

It is known to employ metallic sulfids and especially copper sulfid for molding and insulating purposes and they have also been proposed in conjunction with sulfur for the manufacture of thermo-electric elements; also an acid resisting composition of pyrites sulfur and sand has been proposed.

The invention has for its object to produce a composition of matter having a metallic sulfid and especially copper sulfid cuprous or cupric as its base and to produce a compound that is homogeneous that has a substantially constant electro-motive force and that yields high efficiency in the development of electric current by the application of heat and which has an electrical resistance diminishing instead of increasing with the increase of temperature.

I have found that by the addition of kaolin or of a substance having some of the characteristics of kaolin to a metallic sulfid and especially to copper sulfid, to which a quantity of sulfur is also added, a compound is produced that under practical conditions possesses a high degree of thermal resistance and a very low electric resistance. It will be understood that the invention is not limited to any particular proportion of the respective substances. A proportion in the ultimate product of about 20% of sulfur, and a proportion of about from 1 to 2% of kaolin has been found effective. The substances specified are melted together and the liquid mass thus produced is cooled to solidification, and then crushed to reduce it to a fine powder. This fine powder is then compressed under pressure in molds or in envelops or casings, which conveniently may take the form of tubes, rectangular cases, etc. By such treatment a homogeneous, hard and refractory substance is produced, and when the mixture is compressed into envelops or casings complete contact of the substance with the envelops or casings results. After compression the compound is heated to about 800° C. which has to be done in a closed vessel and by which it is further indurated and rendered ready for use.

In carrying the process into effect, by way of example I take 25 to 30 parts of sulfur with about from 1 to 2 parts of kaolin and I melt the mixture of sulfur and kaolin with about 78 to 80 parts of copper sulfid in a covered crucible until about 20% or parts of sulfur remains, I then allow the molten mass to cool. I then reduce it to the condition of fine powder and subject it to pressure as described.

As to its uses: the compound may generally be used as a heat insulating material, for example, as a covering for boilers and steam pipes, and for the interior of safes, and refrigerating apparatus and the like. It may also be used for the purpose of the production of electric current by the application of heat. For example a bar of this compound, if heated at one end, will generate an electric current from the hotter to the colder end; and a battery or generator may be readily formed from a number of such bars or generator elements or units connected together in parallel or in series by metallic conductors and heat applied thereto.

In the use of the compound for the manufacture of elements for thermo-electric generators or other purposes in which the compound is subject to great heat or variation of temperature I retain the compound within a hermetically closed casing so as to avoid the possibility of its oxidation and disintegration. I preferably form the casing of brass, since this metal has substantially the same coefficient of expansion as the compound, and I hermetically close this casing with an insulating material through which a conductor passes into the midst of the compound. This conductor forms one pole and the casing the other pole of the couple. When this casing is heated exteriorly, there is a hot junction between the casing and the compound and a cold junction between the said conductor, and the compound which as above stated has a high thermal resistance.

It will thus be understood that the invention is not limited to any particular use or application of the compound, nor yet is it limited to any particular method of preparation.

In the manufacture of the compound, instead of kaolin, quartz in a fine condition, sand, clay, or any other substance having the characteristics of kaolin may be employed, while cupric sulfid may be substituted in some cases to the cuprous sulfid which I prefer.

I claim:

1. A homogeneous composition consisting of copper sulfid, sulfur and kaolin.

2. A composition consisting of the following substances in substantially the following proportions: copper sulfid 78 per cent., sulfur 20 per cent., and a substance having the characteristics of kaolin 2 per cent.

P. FERRA.

Witnesses:
ERNST TAPPERT,
HERBERT D. JAMESON.

Copies of this patent may be obtained for five cents each, by addressing the "Commissioner of Patents, Washington, D. C."